United States Patent Office 3,702,125
Patented Nov. 7, 1972

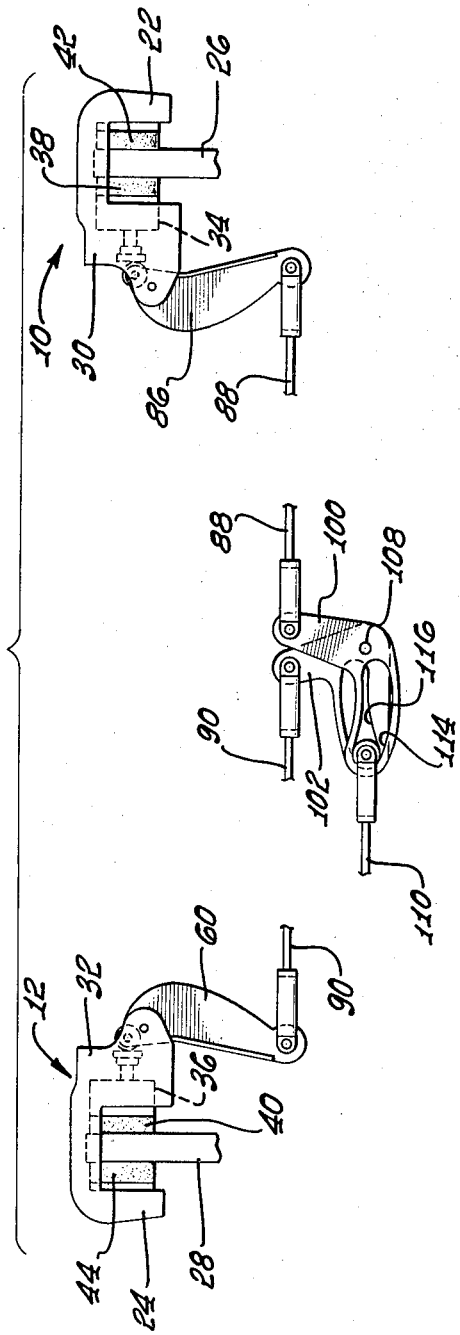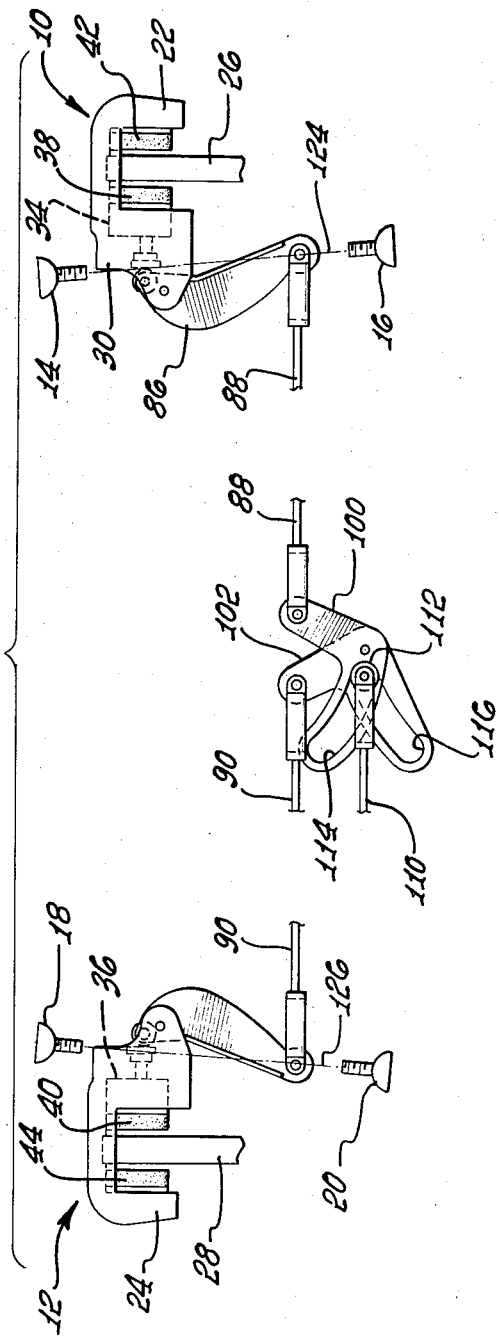

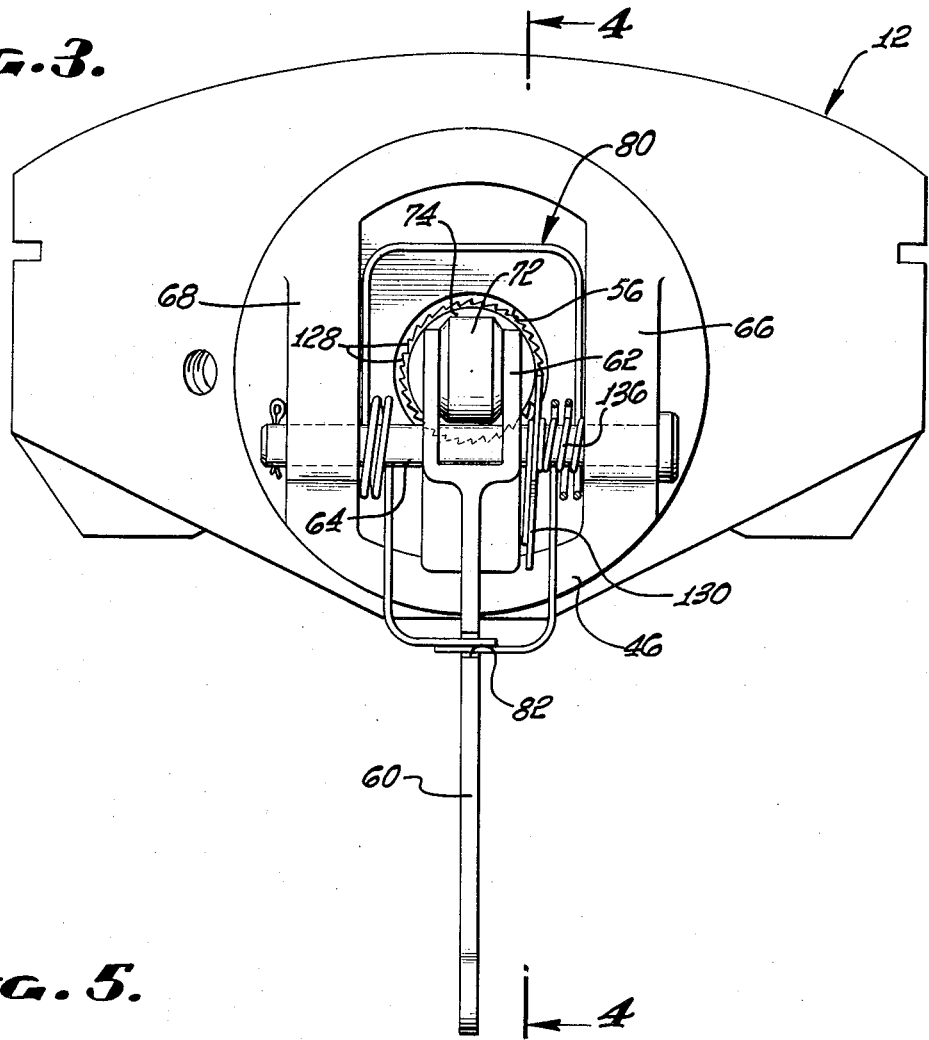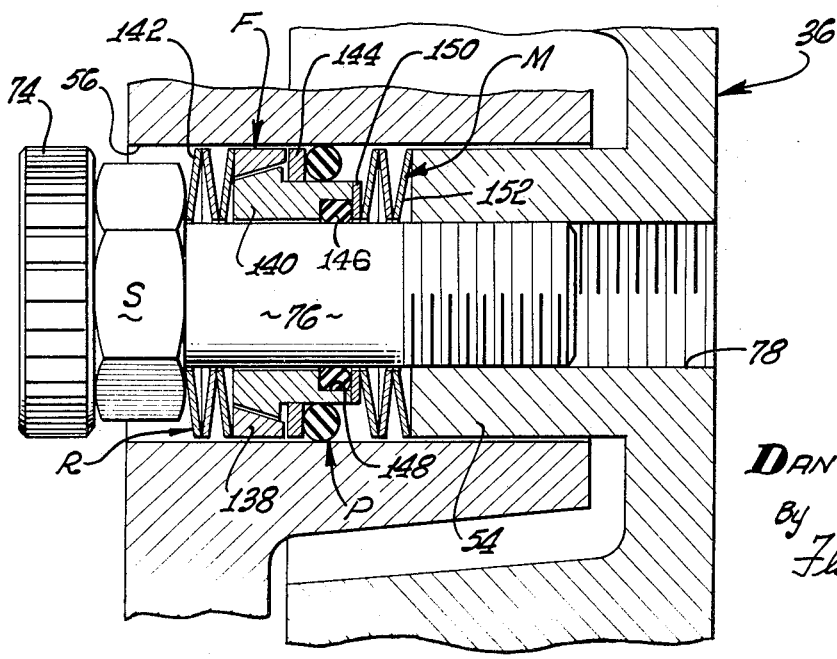

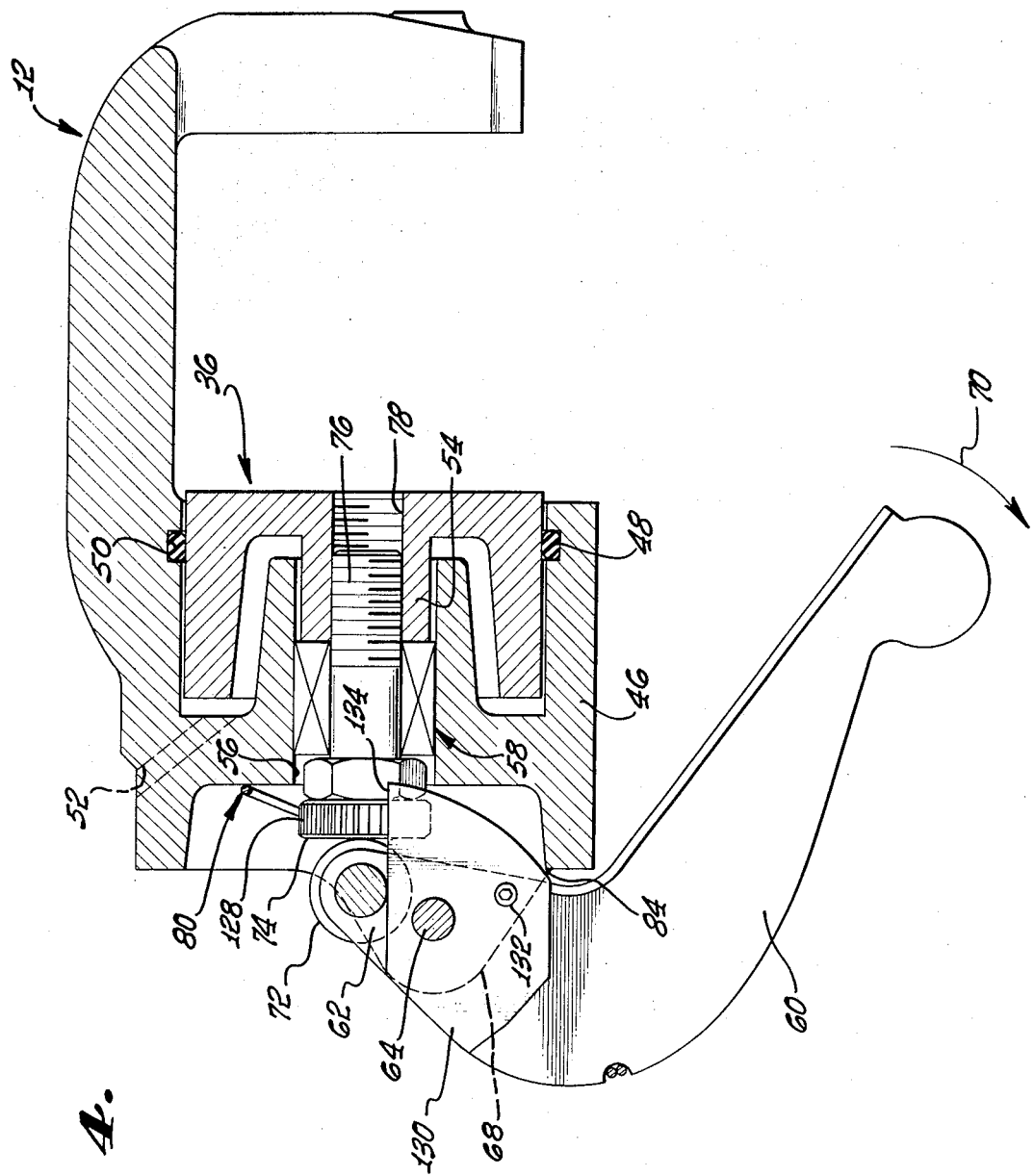

3,702,125
COMPENSATING HYDRAULIC BRAKE STRUCTURE WITH MANUAL OVERRIDE
Dan W. Jeffries, Los Angeles, Calif., assignor of a fractional part interest to Harold W. Nash, Los Angeles, Calif.
Filed June 18, 1970, Ser. No. 47,461
Int. Cl. F16d 65/52
U.S. Cl. 188—71.8         7 Claims

ABSTRACT OF THE DISCLOSURE

The improved compensator utilizes a friction ring that locks up in a small bore in the caliper part located behind the piston. A long mounting screw projects rearwardly from the piston and extends through the friction ring and the caliper bore. A double acting spring suspension provides a floating mounting for the piston and determines its normal axial position. One section of the spring suspension is interposed between the friction ring and the back of the piston and acts as a memory spring; the other section of the spring suspension is interposed between the friction ring on the opposite side and an adjustment nut carried on the mounting screw. The adjustment nut is exteriorly accessible.

BACKGROUND OF THE INVENTION

This invention relates to hydraulic brake structures having compensators and of the general type shown in my prior U.S. Letters Pat. No. 3,277,983, but having provisions for override through an emergency or parking brake linkage.

Compensators, to be acceptable, must have certain essential features including a supplemental piston for moving the friction ring whereby compensation is achieved in both directions, and including a memory spring so that certain shock loads do not disturb the adjustment. A compact compensator unit is shown in my prior U.S. Letters Patent No. 3,443,669.

The primary object of this invention is to provide an improved unit of this character, but in which (1) the clearance or retraction movement can be readily adjusted after the unit is installed; (2) the unit permits the installation of a simple mechanical linkage for mechanical override by an emergency or parking brake; and (3) manufacturing tolerances are uncritical so far as they affect the requisite action of the unit.

Prior art mechanism have been provided for manually assisting the movement of a hydraulic piston. These mechanisms in general have been quite complicated. Another object of this invention is to provide a simple manual override for a hydraulic brake system and a novel linkage whereby such override can be effectively used on vehicle wheels that are suspended for steering.

BRIEF SUMMARY OF THE INVENTION

The improved compensator utilizes a friction ring that locks up in a small bore in the caliper part located behind the piston. A long mounting screw projects rearwardly from the piston and extends through the friction ring and the caliper bore. A double acting spring suspension provides a floating mounting for the piston and determines its normal axial position.

One section of the spring suspension is interposed between the friction ring and the back of the piston and acts as a memory spring; the other section of the spring suspension is interposed between the friction ring on the opposite side and an adjustment nut carried on the mounting screw. The adjustment nut is exteriorly accessible.

A simple lever and ratchet mechanism mounted on the outside of the caliper transmits thrust to the piston through the head of its mounting screw. By the aid of a scissor mechanism, force from the hand lever or pedal is equally divided and applied to a linkage for both front wheels. By locating elements of the linkage judiciously, neither turning of the wheels nor shock loads on the wheels affect the operation of the linkage.

BRIEF DESCRIPTION OF THE DRAWINGS

A detailed description of the invention will be made with reference to the accompanying drawings. These drawings, unless described as diagrammatic or unless otherwise indicated, are to scale.

FIG. 1 is a diagrammatic view of a brake system for the front wheels of an automobile, the brakes being engaged by the emergency pedal or hand lever.

FIG. 2 is a diagrammatic view similar to FIG. 1 but illustrating the brakes in disengaged position.

FIG. 3 is an inside elevational view of a caliper for one of the front wheel brakes.

FIG. 4 is a transverse sectional view taken along the plane corresponding to line 4—4 of FIG. 3 and illustrating the caliper, piston and ratchet mechanism.

FIG. 5 is an enlarged sectional view showing details of the compensator mechanism.

DETAILED DESCRIPTION

The following detailed description is of the best presently contemplated mode of carrying out the invention. This description is not to be taken in a limiting sense, but is made merely for the purpose of illustrating the general principles of the invention since the scope of the invention is best defined by the appended claims.

General orientation

In FIGS. 1 and 2, caliper structures 10 and 12 are shown that are attached in a suitable manner to the front wheel spindles (not shown). In a conventional manner the generally upright portions of the spindles are secured to the upper and lower ball joints 14–16 and 18–20 (FIG. 2). The ball joints 14–16 and 18–20 are secured respectively to the upper and lower arms of the wheel suspension.

The calipers 10 and 12 have outboard anvil parts 22 and 24 that overlie the rims of the wheel carried brake discs or rotors 26 and 28 repsectively. The calipers 10 and 12 have inboard parts 30 and 32, each accommodating a piston 34 and 36. The pistons 34 and 36 carry friction material 38 and 40 urged upon actuation of the pistons to engage the discs 26 and 28. The discs 26 and 28, in turn, engage friction material 42 and 44 supported on the inside of the anvil parts 22 and 24. The mechanisms for each wheel are identical; hence, a description of one will suffice as a description of the other.

The piston 36 shown in FIG. 4 fits a cylinder 46 that opens on the inside of the caliper 12. An O-ring 48, accommodated in an internal groove 50, engages the smooth cylindrical periphery of the piston 36 and seals the inside of the cylinder 46. When the brakes are applied, fluid under pressure is conducted to the cylinder 46 via a duct 52.

The piston 36 has a central hub part 54 that, in the retracted position, partially projects into a through bore 56 formed in the caliper 12. The bore accommodates a compact compensator unit 58 to be described in detail hereinafter.

Parking or emergency brake

The piston 36 may also be moved toward the anvil 24 by a crank 60 independently of the hydraulic system for a variety of purposes. One purpose may be to provide a back-up system for safety; another purpose may be to supplement the hydraulic system under heavy braking requirements; still another purpose may be to lock the wheels for parking. The crank 60 has a bifurcated short end 62 through which a pin 64 passes (see also FIG. 3) to mount the crank. The pin 64 passes through apertures in a pair of spaced lugs 66 and 68 projecting rearwardly of the caliper 12.

Upon angular movement of the crank 60 in a clockwise direction (arrow 70 of FIG. 4) an inward force is applied to the piston 36. For this purpose, the bifurcated end 62 carries a roller 72 that engages the head 74 of a screw 76 (FIG. 4) threadedly engaged in a through threaded bore 78 in the hub part 54 of the piston.

The crank 60 is urged to retracted position by a leaf spring 80 of generally looped configuration (FIG. 3). The leaf spring 80 fits between the lugs 66 and 68 and has coils surrounding the pin 64. The spring is connected to the crank 60 on one side of the pin 64 at an aperture 82. The other side is stopped by engagement of the crank with the caliper 12 (FIG. 4) at a point 84.

The crank 60 (FIG. 1) and the corresponding crank 86 for the other wheel may be moved by cables 88 and 90 against the force of the return springs in order to apply the brakes. Suitable coupling hardware is provided.

The ends of the cables remote from the cranks 60 and 86 are respectively connected to a pair of scissor-levers 100 and 102. The scissor-levers are connected by a pin 108 mounted on the vehicle frame. The ends of the cables connected to the scissor-levers are aligned and substantially tangent to the arc of movement of the scissor-levers. Idler pulleys (not shown) may be provided if required.

The cables 88 and 90 move apart under the influence of the retraction springs for the cranks 60 and 86 and as illustrated in FIG. 2. By closing the scissors, both brakes are applied. The cable forces balance by virtue of the pin mounting of the scissor-levers; hence, the braking forces are equalized even though the travel of one crank may be slightly different than the travel of the other. A single pedal or hand lever is provided for closing the scissors and for operating both cables 88 and 90. The pedal or hand lever is connected to one end of a cable 110. The other end of the cable carries a roller 112 that fits at the intersection of cam slots 114 and 116 formed in the scissor-levers 100 and 102 respectively. Under the influence of the retraction springs, the intersection of the cam slots 114 and 116 moves in a direction away from the pedal or hand lever. Thus, when the pedal or hand lever is moved, the cable 110 pulls the roller 112 in a direction to cause the crank cables 88 and 90 to move towards each other as illustrated in FIG. 1. The movement of the cable is limited by engagment of the roller 112 with the ends of the cam slots 114 and 116.

Turning movement of the wheels does not result is undesired movement of the cables. For this purpose, the points of attachment of the cables to the cranks are located along the turning axes 124 and 126 defined by the ball joints 14–16 and 18–20. The position along the length of the axes 124 and 126 may be selected to minimize cable movement under shock conditions. Different vehicles may thus require slightly different cranks. By virtue of the judicious location of the points of cable attachment, the brakes will not be accidentally engaged either as a result of turning or as a result of shock.

Ratchet adjustment

In order to ensure that the crank has an adequate stroke despite wear of the friction lining, a means of adjustment must be provided. Adjustment is achieved by rotating the screw 76 outwardly as wear takes place. This adjustment is accomplished automatically by a simple ratchet mechanism. The ratchet mechanism comprises, first, ratchet teeth 128 (FIGS. 3 and 4) formed on the head 74 of the screw 76 and, second, a pawl 130. The pawl 130 is a thin metal plate that fits against the side of the crank 60. It has a hole through which the mounting pin 64 passes. A screw 132 couples the plate 130 to the crank 60 but the screw is not tightened down. Accordingly, a limited lateral play of the plate 130 is permitted.

The pawl 130 has an edge 134 (FIG. 4) cooperable with the ratchet teeth 128. A small compression spring 136 (FIG. 3) urges the pawl plate 130 into ratchet engagement but yields to permit the plate to ride over the ratchet teeth on the return stroke. The normal stroke of the crank 60, as determined by the normal brake clearance, is inadequate to cause the pawl to slip back a tooth. The normal position of the piston gradually advances by virtue of the operation of the compensating mechanism hereinafter to be described. The stroke of the crank correspondingly increases until on the return, the pawl slips back a tooth. On the succeeding stroke the screw 76 is turned in order to restore the desired stroke.

Mounting of emergency brake

The entire emergency brake system can be removed simply by removal of the mounting pin 64. The head 128 may be removed with the piston since its diameter is less than that of the caliper bore 56.

Compensator

The compensating mechanism is shown in detail in FIG. 5. It is generally similar to the compensating mechanism shown in my prior patents, No. 3,433,669 and No. 3,277,983. The compensating mechanism includes a friction ring assembly F that grips the caliper bore 56, a retraction spring R, a stop S, a memory spring M, and a supplemental piston P in the form of an O-ring. The screw 76 extends rearwardly through the friction ring assembly. Its intermediate part is smooth and unthreaded for purposes apparent hereinafter. The outer end of the screw adjacent its head is again threaded to mount the stop S which takes the form of a hex nut.

The friction ring assembly includes a split ring 138 having a conical interior surface that fits over the conical exterior surface of a base ring 140. The split ring 138 is spring urged on the base ring so as to cause it to expand and thus to engage the bore 56. This is achieved by the aid of a stack of three Belleville washers 142 that together comprise the retraction spring R. The Belleville washers 142 are stacked alternately so that one end washer is oriented to engage the friction ring 138 at a place radially beyond the base ring.

The friction ring F is urged in the opposite or releasing direction by the supplemental piston P which is exposed to the pressure in the cylinder. When pressure is high enough, the friction ring releases, allowing the piston to act under conditions of caliper deflection without excessive friction drag at the ring F.

The supplemental piston P operates through a washer 144 to engage the overhaning end of the friction ring 138. The effective area of the supplemental piston P is selected so that friction ring release occurs just after the retraction spring R bottoms out.

The supplemental piston P together with an O-ring 146 prevents escape of fluid through the bore 56. The ring 146 is accommodated in an undercut groove 148 in the base ring 140 and thus seals between the intermediate portion of the screw 76 and the base ring 140. The supplemental piston P seals between the base ring 140 and the bore 56. The groove 148 for the O-ring 146 is closed by a retaining washer 150.

The memory spring M comprises a similar stack of three Belleville washers 152. One end washer is oriented to engage the base ring 140 through engagement with the retaining washer 150.

The piston floats on a spring suspension comprising the memory spring M and the retraction spring R. The springs M and R serve to locate the piston on opposite sides of the friction ring assembly wherever the friction ring assembly may happen to be and simply in accordance with the number and strength of springs in the respective stacks.

Assuming the piston is in proper adjustment and in the retracted position illustrated in FIG. 5, then upon application of pressure, the piston 36 immediately moves forward against the force of the retraction spring R as the fluid pressure increases; no preset force must first be overcome and the action is thus smooth. If the brakes are applied with predetermined small force, the retraction spring R bottoms out. The friction ring assembly F releases and remains stationary as the caliper deflects rearwardly. When deflection is reduced, the friction ring assembly locks up. Thereafter, the retraction spring R creates the requisite clearance. The memory spring M allows for a substantial inward travel of the piston 36 without disturbing the adjusted position of the friction ring assembly F.

The adjusting nut S is accessible exteriorly for clearance setting after installation. The piston together with the screw 76 and the compensator mechanism are installed as a unit. The stop nut S may be tightened down to take up the clearance in both springs R and M; the nut S is then backed off to any degree desired by the brake mechanic. The clearance need not be, and preferably is not, preset. Clearance can be determined most effectively at the time of installation and under the "feel" of the particular lining.

There is danger neither of clearances being lost nor clearances being excessively opened as a result of the adjustments of the stop nut S. There are no critical interrelationships of parts.

Intending to claim all novel, useful and unobvious features shown or described.

I claim:

1. In a compensating brake structure:
   (a) a caliper having means forming a cylinder for accommodating a piston said caliper having a bore at the bottom of the cylinder;
   (b) a piston accommodated in said cylinder and movable relative to said caliper to engage a brake disc or the like;
   (c) an extension rod threadedly attached to and projecting rearwardly from the piston through said caliper bore;
   (d) a nut threadedly mounted on the outer end of said rod, the inner surface of said nut forming a stop and accessible exteriorly of the cylinder rearwardly of said caliper to permit establishment of the separation between said stop and said piston after assembly of said structure, thereby establishing the retraction distance between said piston and said brake disc;
   (e) a friction ring engageable with said caliper bore and surrounding said extension rod;
   (f) a pair of compression springs respectively on opposite sides of said friction ring, one of said springs serving as a retraction spring for said piston and engaging said stop, and the other of said springs serving as a memory spring and engaging the piston; and
   (g) a supplemental piston subjected to the pressure of fluid in said cylinder for releasing the friction ring to permit movement of said extension rod relative to said caliper bore and beyond the limits of said retraction and memory springs upon the existence of greater than a predetermined pressure in said cylinder;
   (h) said (e), (f) and (g) elements together forming a compensator mechanism carried by said piston-attached extension rod;
   (i) and a lever mounted on the caliper and movable to engage the end of said rod to provide a manual assist or override for emergency or parking functions.

2. The combination as set forth in claim 1 in which said compression springs comprise stacks of selected numbers of Belleville springs in order to achieve a desired relationship between retraction spring movement and memory spring movement.

3. The combination as set forth in claim 1 together with lever actuated means cooperating with said extension rod for maintaining the distance between said brake disc and said rod end approximately constant independent of said retraction distance adjustment.

4. In a compensating brake structure:
   (a) a caliper part having means forming a cylinder for accommodating a piston; said caliper part having a bore at the bottom of said cylinder;
   (b) a piston accommodated in said cylinder and engageable with a brake disc or the like;
   (c) a member threadedly accommodated in said piston and having a shank part extending through said caliper bore;
   (d) compensator means cooperable with said piston and said bore for maintaining preset clearance between the piston and the brake disc comprising a base ring surrounding said shank and having a conical exterior surface,
      a split friction ring having a conical interior surface mounted on said base ring for selective engagement with said bore,
      a retraction spring surrounding said shank between said split friction ring and a stop at the end of said member,
      a memory spring surrounding said shank part between said base ring and said piston, and
      supplemental piston means comprising an O-ring and washer between said split friction ring and said piston for offsetting said split friction ring with respect to said base ring to disengage said friction ring from said bore when the pressure in said cylinder exceeds a predetermined value;
   (e) said member having ratchet teeth at its outer end;
   (f) a lever pivotally mounted on the caliper for movement about an axis transverse to said bore and cylinder, and having an end engageable with the end of said member for application of force to said piston; and
   (g) a pawl carried by said lever and engageable with said ratchet teeth to rotate said member in a direction to compensate for brake lining wear while substantially maintaining said preset clearance.

5. The combination as set forth in claim 4 together with a wheel spindle mounting said caliper part; a suspension for said wheel spindle, including a pair of spaced ball joints defining a steering axis; spring means urging said lever to a retracted position; and a linkage for moving said lever against the force of said spring and connected to said lever at a place falling along the said steering axis when said lever is retracted whereby the angular position of said spindle does not affect said lever.

6. The combination as set forth in claim 4 in which said caliper part has a pair of spaced rearwardly extending lugs located on opposite sides of the rearward projection of said caliper part bore; said lever having a fulcrum part located between said lugs; a pin extending through said lugs and said fulcrum part for pivotally mounting said lever; a retraction spring for said lever of looped configuration and fitting between said lugs, said spring having parts located between the lugs and the sides of said fulcrum part coiled about said pin, one end of said spring engaging said caliper part and the other end engaging the lever.

7. The combination as set forth in claim 6 in which said pawl comprises a plate located on one side of said fulcrum part, and having a hole through which said pin passes; means coupling said plate for angular movement with said lever but allowing movement of said plate axially of said pin; said plate being positioned substantially tangentially of said ratchet teeth with the edge of said plate positioned to engage the ratchet teeth; and a coil spring urging said plate axially in a direction to engage said ratchet teeth, said coil spring surrounding said pin.

References Cited

UNITED STATES PATENTS

| | | | |
|---|---|---|---|
| 3,338,354 | 8/1967 | Jeffries | 188—196 P |
| 3,269,490 | 8/1966 | Swift | 188—71.9 |
| 2,648,351 | 8/1953 | Curtis et al. | 74—104 X |
| 2,921,651 | 1/1960 | Myers | 188—72.6 X |
| 3,372,775 | 3/1968 | Beller et al. | 188—71.9 |
| 3,443,669 | 5/1969 | Jeffries | 188—70 |
| 3,456,765 | 7/1969 | Meier | 188—72.6 X |
| 3,199,635 | 8/1965 | Bessler et al. | 188—196 P |
| 3,377,076 | 4/1968 | Burnett | 188—71.8 |
| 3,478,044 | 11/1969 | Beuchle | 188—18 A |

FOREIGN PATENTS

| | | | |
|---|---|---|---|
| 1,372,854 | 8/1964 | France | 188—72.9 |
| 384,918 | 5/1924 | Germany | 74—104 |

GEORGE E. A. HALVOSA, Primary Examiner

U.S. Cl. X.R.

188—71.9, 72.9, 106 F, 196 P, 196 BA